(12) United States Patent
Addy

(10) Patent No.: US 6,471,125 B1
(45) Date of Patent: Oct. 29, 2002

(54) METHOD OF TRACKING PRODUCE SELECTION DATA

(75) Inventor: John C. Addy, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/577,783

(22) Filed: May 24, 2000

(51) Int. Cl.[7] .............................................. G06F 17/60
(52) U.S. Cl. ............. 235/385; 235/462.11; 235/462.14; 705/20; 705/23
(58) Field of Search .................................. 235/385, 378, 235/383, 462.01, 462.11, 462.14, 462.41, 462.42; 705/20, 22, 23, 24

(56) References Cited

U.S. PATENT DOCUMENTS

| | | | |
|---|---|---|---|
| 4,693,330 A | 9/1987 | Uchimura et al. ............. 177/25 |
| 5,166,755 A | 11/1992 | Gat ............................. 356/419 |
| 5,546,475 A | 8/1996 | Bolle et al. .................. 382/190 |
| 5,711,980 A | * 1/1998 | Terry ........................... 426/392 |
| 5,867,265 A | 2/1999 | Thomas ...................... 356/328 |
| 6,024,281 A | * 2/2000 | Shepley ...................... 235/375 |
| 6,155,489 A | * 12/2000 | Collins et al. ......... 235/462.01 |
| 6,260,023 B1 | * 7/2001 | Seevers et al. ............... 705/20 |

* cited by examiner

Primary Examiner—Karl D. Frech
Assistant Examiner—Daniel St. Cyr
(74) Attorney, Agent, or Firm—Paul W. Martin

(57) ABSTRACT

A method of tracking produce selection data which minimizes fraud. The method includes the steps of receiving produce identification information, including a number of possible candidates, displaying the produce identification information, recording the produce selection data in a log record, and determining from information in the log record whether the produce selection data is likely incorrect and whether to issue an alert to store management.

17 Claims, 4 Drawing Sheets

FIG. 2

| Operator | Date | Time | Choice | Price | Weight | List | Rank | Price1 | Price2 | Price3 | Price4 | Price5 | Price6 | Item1 | Item2 | Item3 | Item4 | Item5 | Item6 | Alert |
|---|---|---|---|---|---|---|---|---|---|---|---|---|---|---|---|---|---|---|---|---|
| Jack | 1/1/00 | 1200 | Apple | $.50/lb | 1 lbs | C | 1 | $.50/lb | $1/lb | $.75/lb | $.80/lb | $.34/lb | $.20/lb | Apple | Tomato | Pepper | Radish | Beets | Cabbage | No |
| Earl | 1/1/00 | 1300 | Avocado | $2/lb | 2 lbs | M | 0 | $.20/lb | $30/lb | $.35/lb | $.15/lb | $.40/lb | $.10/lb | Lettuce | Cabbage | Spinach | Celery | Pepper | Parsley | Yes |

40

METHOD OF TRACKING PRODUCE SELECTION DATA

CROSS-REFERENCE TO RELATED APPLICATIONS

The present invention is related to the following commonly assigned and co-pending U.S. application:

"A Produce Data Collector And A Produce Recognition System", filed Nov. 10, 1998, invented by Gu, and having a Ser. No. 09/189,783.

BACKGROUND OF THE INVENTION

The present invention relates to product checkout devices and more specifically to a method of tracking produce selection data.

Bar code readers are well known for their usefulness in retail checkout and inventory control. Bar code readers are capable of identifying and recording most items during a typical transaction since most items are labeled with bar codes.

Items which are typically not identified and recorded by a bar code reader are produce items, since produce items are typically not labeled with bar codes. Bar code readers may include a scale for weighing produce items to assist in determining the price of such items. But identification of produce items is still a task for the checkout operator, who must identify a produce item and then manually enter an item identification code. Operator identification methods are slow and inefficient because they typically involve a visual comparison of a produce item with pictures of produce items, or a lookup of text in table. Operator identification methods are also prone to error, on the order of fifteen percent.

In a produce recognition system such as the one disclosed in the co-pending application, a produce data collector at a checkout counter captures produce data and sends it to produce recognition software. The produce recognition software compares the captured produce data to previously captured reference produce data within a produce data file or database to identify the produce item.

In one embodiment, the produce recognition software may be configured to require operator verification and final selection. The produce recognition software rank orders candidate identifications for the produce item from most likely to lease likely. The produce recognition software then sends a list of the candidate identifications to a point-of-sale (POS) application running on a client terminal at the checkout counter. The POS application displays a portion of the list and records an operator choice for the produce item. If the identification of the produce item is not in the displayed portion of the list, the operator can page down through the entire list until the correct identification is found.

However, operators may not always identify produce items correctly. Also, some operators could deceive the system by selecting an incorrect identification for a produce item which has a lower cost. Therefore, it would be desirable to provide a method of tracking produce selection data.

SUMMARY OF THE INVENTION

In accordance with the teachings of the present invention, a method of tracking produce selection data is provided.

The method includes the steps of receiving produce identification information, including a number of possible candidates, displaying the produce identification information, recording the produce selection data in a log record, and determining from information in the log record whether the produce selection data is likely incorrect.

Upon detection of incorrect produce selection data, an alert may be issued.

Several ways of determining whether the produce selection data are incorrect and whether to issue an alert. For examples, discrepancies in price, weight, confidence level, color, and category may be factors in determining correctness or incorrectness. Operator history and recognition difficulty may be factors in determining whether to issue an alert.

It is accordingly an object of the present invention to provide a method of tracking produce selection data.

It is another object of the present invention to provide a method of tracking produce selection data and alerting store management to selection problems.

It is another object of the present invention to provide a method of tracking produce selection data at full-service checkout counters, self-service checkout counters, and produce weigh stations.

It is another object of the present invention to provide a method of minimizing fraud in a produce recognition system.

It is another object of the present invention to provide a method of minimizing fraud in a produce recognition system which requires operator verification and final selection of produce item identifications.

It is another object of the present invention to provide a method of minimizing fraud by a self-service shopper who uses a produce recognition system to identify and purchase produce items.

It is another object of the present invention to provide a method of minimizing fraud by a store employee who uses a produce recognition system to identify and record customer purchases of produce items.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a block diagram of one type of produce data collector; and

DETAILED DESCRIPTION OF THE PREFERRED EMBODIMENT

Figure 1:
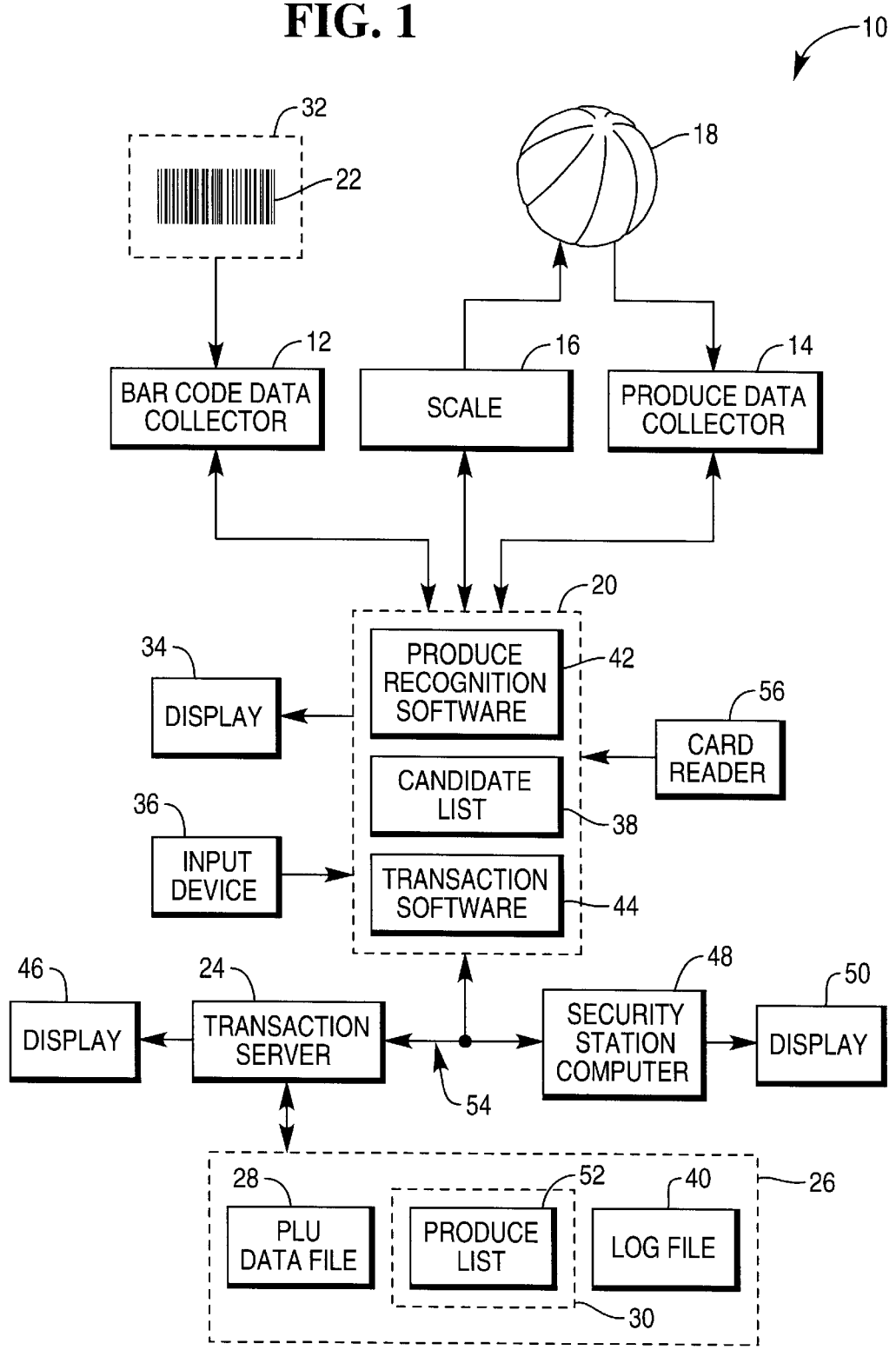
FIG. 1 is a block diagram of a transaction processing system including a produce data collector.

Referring now to FIG. 1, transaction processing system 10 includes bar code data collector 12, produce data collector 14, and scale 16.

Bar code data collector 12 reads bar code 22 on merchandise item 32 to obtain an item identification number, also know as a price look-up (PLU) number, associated with item 32. Bar code data collector 12 may be any bar code data collector, including an optical bar code scanner which uses laser beams to read bar codes. Bar code data collector 12 may be located within a checkout counter or mounted on top of a checkout counter.

Produce data collector 14 collects data for produce item 18 or any other non-barcoded merchandise item. Such data may include color and color distribution data, size data, shape data, surface texture data, and aromatic data. Reference produce data is collected and stored within produce data file 30. During a transaction, operation of produce data collector 14 may be initiated automatically by sensing placement of produce item 18 on scale 16 or by sensing a drop in ambient light level. Operation of produce data collector 14 may also be initiated manually by operator-initiated commands from transaction terminal 20.

Produce data collector 14 may be located within a checkout counter or mounted on top of a checkout counter. Produce data collector 12 may also be located with scale 16 at a produce weigh station. Also, bar code data collector 12 and produce data collector 14 operate separately from each other, but may be integrated together. Bar code data collector 12 works in conjunction with transaction terminal 20 and transaction server 24.

Scale 16 determines a weight for produce item 18. Scale 16 works in connection with bar code data collector 12, but may be designed to operate and be mounted separately, such as at a weigh station. Scale 16 sends weight information for produce item 18 to transaction terminal 20 so that transaction terminal 20 can determine a price for produce item 18 based upon the weight information.

In the case of bar coded items, transaction terminal 20 obtains the item identification number from bar code data collector 12 and retrieves a corresponding price from PLU data file 28 through transaction server 24.

In the case of non-bar coded produce items, transaction terminal 20 executes produce recognition software 42 which obtains produce characteristics from produce data collector 14, determines a candidate list 38 of produce items and corresponding confidence values by comparing produce data in produce data file 30 with collected produce data, and makes list 38 available to transaction software 44.

In an alternative embodiment, identification of produce item 18 may be handled by transaction server 24. Transaction server 24 receives collected produce characteristics, determines candidate list 38 and corresponding confidence values by comparing produce data in produce data file 30 with collected produce data, and makes list 38 available to transaction software 44.

To assist in proper identification of produce items, transaction software 44 displays candidate produce items for operator verification. Transaction software 44 preferably arranges the candidate produce items in terms of probability of match or confidence level and displays them as text and/or color images on display 34. The operator may accept the most likely candidate returned by produce recognition software 42 or override it with a different choice from list 38 or from a list 52 of all produce items within the store. Transaction software 44 records the operator selection.

After identification, transaction software 44 obtains a unit price from PLU data file 28 through transaction server 24 and a weight from scale 16 in order to calculate a total cost of produce item 18. Transaction terminal 20 enters the total cost into the transaction.

Transaction software 44 stores list 38 and operator selections, including a selection to display list 52, in log file 40. Operator identification information may also be stored within log file 40.

Log file 40 provides data for management review. For example, log file 40 can provide incite about trends which may exist in incorrectly identifying particular produce items. Also, log file 40 can provide incite about problems certain operators may be having in identifying produce items. Certain trends may suggest fraud by a particular operator in selecting a lower-priced produce item from lists 38 or 52.

Transaction software 44 identifies the operator, if possible. One way of identifying operators is by obtaining identification information from cards using card reader 56.

In accordance with the method of the present invention, transaction software 44 also determines the likelihood that an incorrect candidate has been selected. Transaction software 44 compares the confidence value of the recorded item to the confidence values of the other items of list 38. Transaction software 44 also compares the price of the recorded item to the prices of the other items of list 38.

Transaction software 44 may alert store management under certain circumstances. Alerts may be sent to monitoring stations on store network 54. For example, transaction software 44 may alert store management by displaying an appropriate message on display 46 associated with transaction server 24 or display 50 associated with security station computer 48. Other methods of alerting store management are also envisioned. Security station computer 48 may be located near self-checkout lanes or other locations in the store.

Transaction software 44 may include a single program or a plurality of separate programs. For example, the security function may be accomplished by a separate program than the one which accomplishes display and recordation of choices for candidate produce items.

PLU data file 28, produce data file 30, and log file 40 are stored within storage medium 26, but either may also be located instead at transaction terminal 20.

Transaction terminal 20 may be located in a self-service checkout stand or a full-service checkout stand. Log file 40 identifies the type of checkout stand. In the former case, transaction software 44 determines whether a self-service customer has picked the wrong candidate. In the latter case, transaction software 44 determines whether a store employee has picked the wrong candidate.

Transaction terminal 20 may instead be part of a produce weigh station where produce items are identified, bagged, weighed, and priced. Operation may be limited to weighing and identifying produce items, but these functions would occur in a similar manner.

Turning now to FIG. 2, an example log file 40 is illustrated. Log file 40 may be configured in other ways to suit the security needs of the store.

Log 40 includes operator identification information under entry OPERATOR. For a full-service checkout lane, this entry can be obtained from transaction terminal 20. Transaction terminal 20 records operator identification information at each shift change. For a self-service checkout lane, this entry can be obtained from a payment card or a loyalty card, otherwise, the operator is recorded as "unknown". A log record is created regardless of whether the operator can be positively identified.

Date and time information for produce selections are recorded under entries DATE and TIME. Transaction software 44 provides these entries from its internal clocks.

Produce selection information is recorded under entry CHOICE. Transaction software 44 provides the choice made by the operator during produce selection.

The price of the selected produce item is recorded under entry PRICE. Transaction software 44 obtains the price information from PLU data file 28.

The weight of the selected produce item is recorded under entry WEIGHT. Transaction software 44 obtains the weight information from scale 16.

The list where the selected produce item came from is recorded under entry LIST. If the selected produce item can from candidate list 38, then transaction software 44 records "candidate" under entry LIST. If the operator selected the produce item from list 52, then transaction software 44 records a "master" under entry LIST.

Rank information for the selected produce item is recorded under entry RANK. If the selected produce item came from candidate list 38, then transaction software 44 records its rank. For example, if candidate list 38 includes four produce items, and the operator selected a produce item from list 38, then transaction software 44 records a number from one to six under entry RANK. If the selected produce item can from candidate list 52, then transaction software 44 records a zero under entry RANK.

Item information for each candidate in list 38 is recorded under entries ITEMn, where n is the number of candidates in list 38.

Price information for each candidate in list 38 is recorded under entries PRICEn, where n is the number of candidates in list 38.

Transaction software 44 records alert information under entry ALERT. If transaction software 44 determines that an alert condition exists, then transaction software 44 records a "yes", otherwise, transaction software 44 records a "no".

Figure 3A:
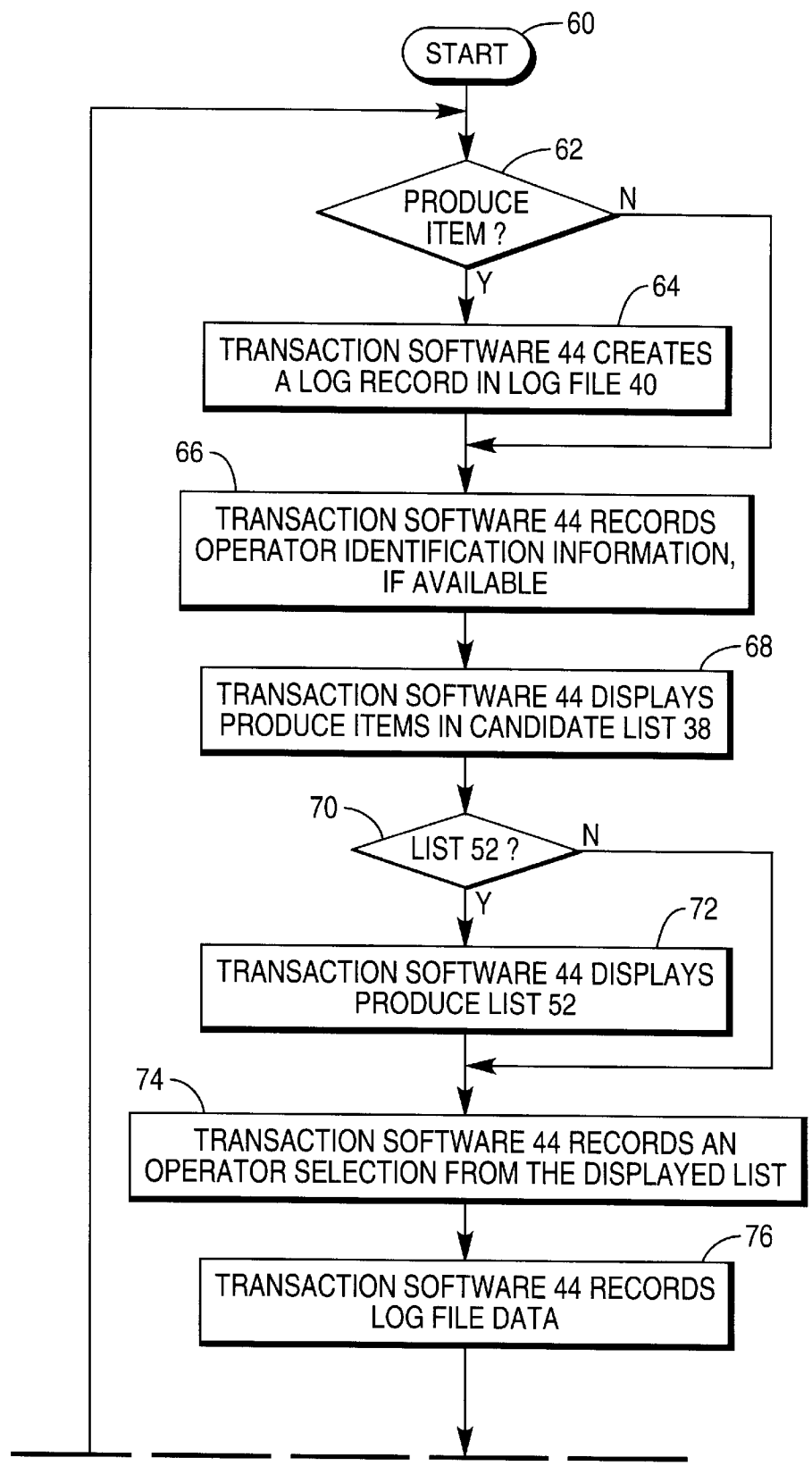
FIGS. 3A and 3B form a flow diagram illustrating the method of the present invention.
Figure 3B:
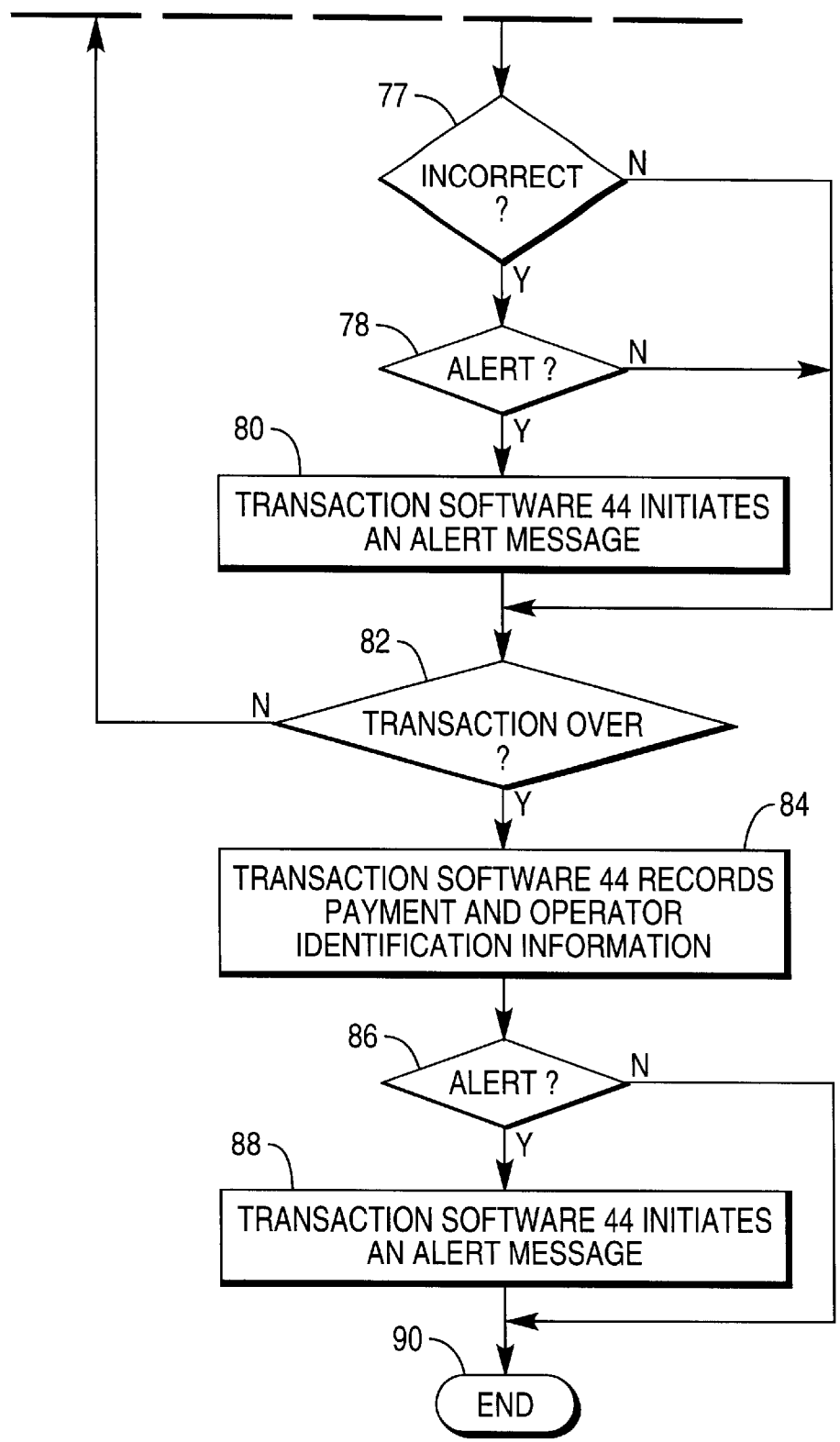

Referring now to FIG. 3, the method of tracking produce data is illustrated beginning with START 60. The method is performed for each transaction.

In step 62, transaction software 44 waits for produce data.

In step 64, transaction software 44 creates a log record in log file 40 after receiving produce data from produce recognition software 42. Transaction software 44 records data and time information and candidate list information.

In step 66, transaction software 44 records operator identification information, if available, under entry OPERATOR. Operator identification information for a full-service checkout lane is typically available at the start of each shift change. However, self-service operator information may not be available, unless the self-service operator has a loyalty card or payment card and either are required by the store to be read as an early step in the checkout process, rather than at the end of the checkout process.

Knowing the operator identification information early in the transaction allows transaction software 44 to use historical operator information in log file 40 to consider whether to issue an alert and allows transaction software 44 to issue an alert at any time during the transaction.

In step 68, transaction software 44 displays produce items in candidate list 38.

In step 70, transaction software 44 determines whether the operator calls up list 52. If so, operation proceeds to step 72. If not, operation proceeds to step 74.

In step 72, transaction software 44 displays produce list 52.

In step 74, transaction software 44 records an operator selection from the displayed list, either candidate list 38 or produce list 52.

In step 76, transaction software 44 records an identifier for the list under entry LIST, the identity of the produce item under entry CHOICE, the rank of the choice under entry RANK, and the price of the produce item under entry PRICE.

For example, transaction software 44 may record an "m" for "master" if the operator selection was from list 52 or a "c" for "candidate" if the operator selection was from list 38. If the selection was not made from candidate list 38, transaction software 44 records a zero under entry RANK.

In step 77, transaction software 44 determines whether the selection was likely incorrect. If so, operation proceeds to step 78. If not, then operation proceeds to step 82.

In step 78, transaction software 44 determines whether to issue an alert. If so, operation proceeds to step 80. If not, then operation proceeds to step 82.

Several criteria may be used to determine whether the selection was incorrect and whether to issue an alert. Also, transaction software 44 may use additional data besides the data in log file 40.

For example, transaction software 44 may compare the price of the operator selection to the price of the highest ranked candidate in candidate list 38. If the price of the highest ranked candidate is greater than the price of the operator selection by a predetermined amount, then transaction software 44 may determine that the selection is likely incorrect. Transaction software 44 may issue an alert, or require additional information before issuing an alert.

As another example, transaction software 44 may compare the confidence level of a selected item to the highest confidence level in candidate list 38. Being lower than a predetermined percentage or amount from the highest confidence level leads to a determination by transaction software 44 that the selection is likely incorrect. An alert may follow.

As yet another example, transaction software 44 may compare the weight of a selected item from scale 16 to a typical purchased weight of the selected item. Exceeding the typical purchased weight by a predetermined percentage or amount leads to a determination by transaction software 44 that the selection is likely incorrect. An alert may follow. For example, selecting ten pounds of apples at $0.50 per pound when the typical purchased item weight is one pound and the item having the highest confidence level is more expensive. Typical purchased weight data may be stored in produce data file 30, PLU data file 28, or elsewhere.

As yet another example, transaction software 44 may compare the predominate color of a selected item to the predominate color of the candidate having the highest confidence level in candidate list 38. Selection of a candidate with a different predominate color leads to a determination by transaction software 44 that the selection is likely incorrect. An alert may follow. For example, selecting bananas with a predominate color of yellow when the item having the highest confidence level is predominately green.

As a final example, transaction software 44 may compare the product category of a selected item to the product category of the candidate having the highest confidence level in candidate list 38. Selection of a candidate with a different category leads to a determination by transaction software 44 that the selection is likely incorrect. An alert may follow. For example, selecting bananas when the item having the highest confidence level is in the potato category.

Additional pieces of information to consider before a finding of incorrectness or the issuing of an alert might include the recognition difficulty associated with that type of item and whether the operator selection came from list 52. For example, if green vegetables are more difficult to recognize than red vegetables, then the alert criteria for greed vegetables may be waited in favor of more tolerance.

If operator identification information is available, another piece of information might be whether the operator has received a number of previous alerts or whether the operator has a history of picking a cheaper item when the highest candidate is greater in price.

Also, criteria for issuing alerts may be item or category-specific. For example, if tests indicate that green leafy vegetables are more difficult to identify than other categories of produce, then alert criteria may be adjusted to reflect the difficulty.

In step 80, transaction software 44 initiates an alert message to store management and records a "yes" under entry ALERT. Operation proceeds to steps 82.

The alert message may be sent to a monitoring station or directly to store management over the store's network. Upon receiving the alert, store management, including store security, may wish to intervene and possibly re-process the produce items. If the operator selection is a correct selection, then store management may use the information to improve produce recognition software 42 and/or adjust its alert criteria.

In step 82, transaction software 44 determines whether the transaction is over. If not, operation returns to step 62. If so, operation continues at step 84.

Transaction software 44 may determine that the transaction is over when it records a signal from the operator that there are no remaining items to be processed in the transaction.

In step 84, transaction software 44 records payment. If operator identification information has not already been recorded, transaction software 44 may record it here, if it is available. If transaction software 44 cannot determine the operator identification information, then it records "unknown" under entry OPERATOR.

In step 86, transaction software 44 may again determine whether to issue an alert. If so, operation proceeds to step 88. If not, then operation proceeds to step 90.

In step 88, transaction software 44 initiates an alert message to store management and records a "yes" under entry ALERT.

Operation proceeds to steps 90.

In step 90, the method ends.

Advantageously, the method of the present invention provides useful data for improving produce recognition systems and for minimizing fraud by both full-service and self-service customers.

Although the invention has been described with particular reference to certain preferred embodiments thereof, variations and modifications of the present invention can be effected within the spirit and scope of the following claims.

I claim:

1. A method of tracking produce selection data comprising the steps of:

receiving produce identification information, including a number of possible candidates;

displaying the produce identification information;

recording the produce selection data in a log record;

recording operator identification information in the log record; and determining from information, including information in the log record and accuracy information about prior produce selection data associated with the operator, whether the produce selection data is likely incorrect and whether to issue and alert.

2. A method of tracking produce selection data comprising the steps of:

receiving produce identification information, including a number of possible candidates;

displaying the produce identification information;

recording the produce selection data in a log record;

obtaining full-service operator identification information;

recording the full-service operator identification information in the log record; and determining from information, including information in the log record and accuracy information about prior produce selection data associated with the operator, whether the produce selection data is likely incorrect and whether to issue and alert.

3. A method of tracking produce selection data comprising the steps of:

receiving produce identification information, including a number of possible candidates;

displaying the produce identification information;

recording the produce selection data in a log record;

obtaining self-service operator identification information;

recording self-service operator identification information in the log record; and determining from information, including information in the log record and accuracy information about prior produce selection data associated with the operator, whether the produce selection data is likely incorrect and whether to issue and alert.

4. A method of tracking produce selection data comprising the steps of:

receiving a first weight of a produce item from a scale;

receiving produce identification information, including a number of possible candidates for identifying the produce item;

displaying the produce identification information;

recording the produce selection data in the a log record, including a second weight of a selected produce item on a displayed list of produce items; and determining from information, including information in the log record, whether the produce selection data is likely incorrect, including the a substep of comparing the first and second weights.

5. A method of tracking produce selection data comprising the steps of:

receiving produce identification information, including a number of possible candidate produce items for identifying a produce item;

displaying the produce identification information;

recording the produce selection data in a log record, including a first predominate color of a selected produce item; and determining from information, including information in the log record, whether the produce selection data is likely incorrect, including a substep of comparing the first predominate color of the selected produce item with a second predominate color of a candidate produce item having a highest confidence level.

6. A method of tracking produce selection data comprising the steps of:

receiving produce identification information, including a number of possible candidate produce items for identifying a produce item;

displaying the produce identification information;

recording the produce selection data in a log record, including a first category in which a selected produce item is associated; and determining from information, including information in the log record, whether the produce selection data is likely incorrect, including a substep of comparing the first category of the selected produce item with a second category of a candidate produce item having a highest confidence level.

7. A transaction processing system comprising:

a produce data collector for collecting produce information about a produce item; and a computer which records operator identification information in the log record, which generates a number of possible candidates for identifying the produce item, which displays the candidates, which records a selected candidate, which records the selected candidate in a log record, and which determines from information in the log record and from accuracy information about prior produce selection data associated with the operator whether the selected candidate is likely incorrect.

8. The system as recited in claim 7, wherein the computer also generates an alert if the selected candidate is likely incorrect.

9. The system as recited in claim 7, wherein the computer also records produce list selection data in the log record and determines from produce list selection data whether the selected candidate is likely incorrect.

10. The system as recited in claim 7, wherein the computer also records a rank of the selected candidate in the log record and determines whether the selected candidate is likely incorrect by comparing a rank of the most likely candidate to the rank of the selected candidate.

11. The system as recited in claim 7, wherein the computer also records a price of the selected candidate in the log record and determines whether the selected candidate is likely incorrect by comparing a price of a most likely candidate to the price of the selected candidate.

12. The system as recited in claim 7, further comprising:

a scale for weighing the produce item;

wherein the computer also records a first weight of the produce item from the scale in the log record, records a second weight of the selected candidate in the log record, and determines whether the selected candidate is likely incorrect by comparing the first and second weights.

13. The system as recited in claim 7, wherein the computer also records a first predominate color of the selected candidate in the log record and determines whether the selected candidate is likely incorrect by comparing the first predominate color of the selected candidate with a second predominate color of a candidate produce item having a highest confidence level.

14. The system as recited in claim 7, wherein the computer also records a first category in which the selected candidate is associated in the log record and determines whether the selected candidate is likely incorrect by comparing the first category of the selected candidate with a second category of a candidate produce item having a highest confidence level.

15. A transaction processing system comprising:

a produce data collector for collecting produce information about a produce item;

a scale for weighing the produce item; and a computer which records a first weight of the produce item from the scale in the log record, which generates a number of possible candidates for identifying the produce item, which displays the candidates, which records a selected candidate, which records the selected candidate in a log record, which records a second weight of the selected candidate in the log record, and which determines whether the selected candidate is likely incorrect by comparing the first and second weights.

16. A transaction processing system comprising:

a produce data collector for collecting produce information about a produce item; and a computer which generates a number of possible candidates for identifying the produce item, which displays the candidates, which records a selected candidate, which records the selected candidate in a log record, which records a first predominate color of the selected candidate in the log record, and which determines whether the selected candidate is likely incorrect by comparing the first predominate color of the selected candidate with a second predominate color of a candidate produce item having a highest confidence level.

17. A transaction processing system comprising:

a produce data collector for collecting produce information about a produce item; and a computer which generates a number of possible candidates for identifying the produce item, which displays the candidates, which records a selected candidate, which records the selected candidate in a log record, which records a first category in which the selected candidate is associated in the log record, and which determines whether the selected candidate is likely incorrect by comparing the first category of the selected candidate with a second category of a candidate produce item having a highest confidence level.

* * * * *